(No Model.) 2 Sheets—Sheet 1.
H. ALABASTER & T. E. GATEHOUSE.
CIRCUIT FOR TELEPHONIC COMMUNICATION.
No. 314,305. Patented Mar. 24, 1885.
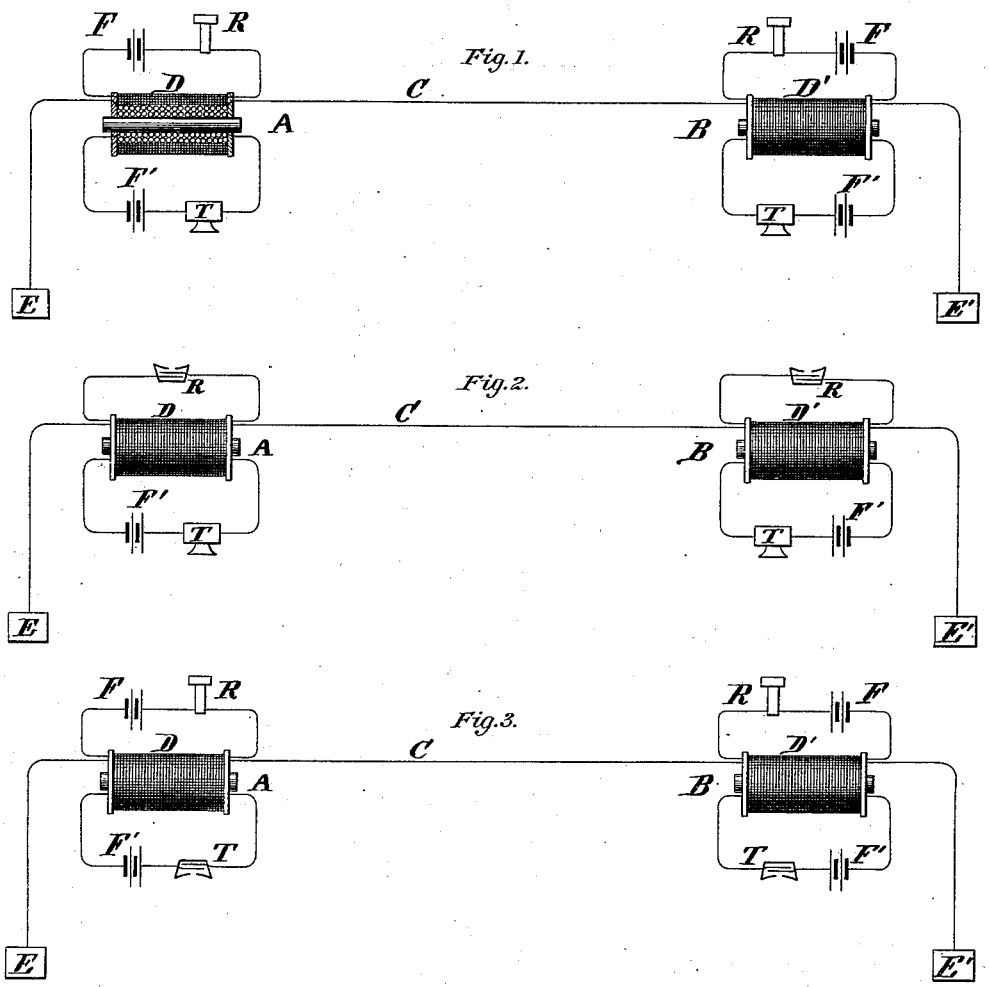
Attest:
Raymond L. Bauer
N. S. Keith.
Inventors:
Henry Alabaster,
Tom Ernest Gatehouse,
by W. J. Johnston
Atty (No Model.) 2 Sheets—Sheet 2.
H. ALABASTER & T. E. GATEHOUSE.
CIRCUIT FOR TELEPHONIC COMMUNICATION.
No. 314,305. Patented Mar. 24, 1885.
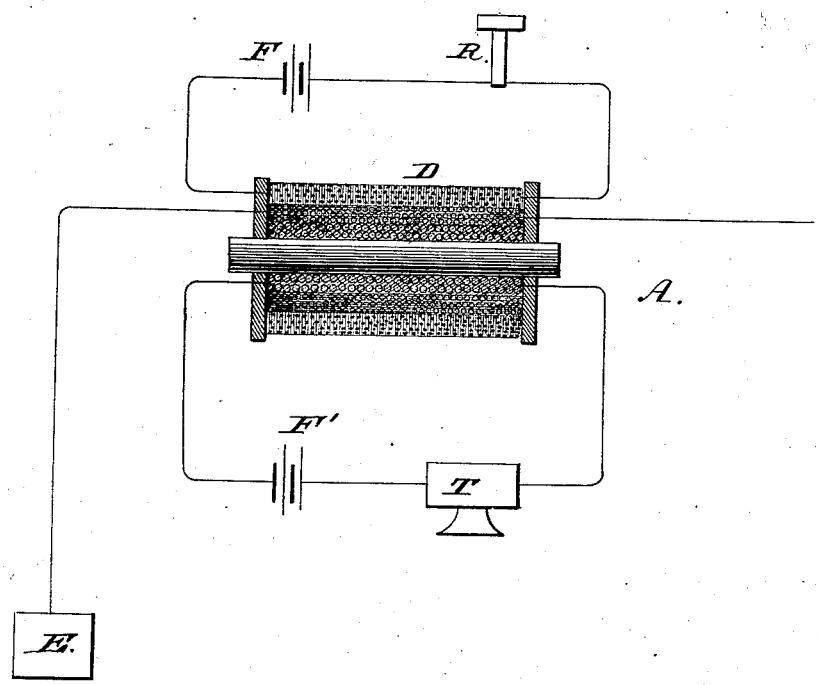

UNITED STATES PATENT OFFICE.

HENRY ALABASTER, OF SOUTH CROYDON, AND TOM ERNEST GATEHOUSE, OF CAMBERWELL, COUNTY OF SURREY, ENGLAND.

CIRCUIT FOR TELEPHONIC COMMUNICATION.

SPECIFICATION forming part of Letters Patent No. 314,305, dated March 24, 1885.

Application filed September 20, 1884. (No model.) Patented in England October 30, 1882, No. 5,166, and in France April 30, 1883, No. 155,180.

*To all whom it may concern:*

Be it known that we, HENRY ALABASTER, of South Croydon, in the county of Surrey, and TOM ERNEST GATEHOUSE, of Camberwell, in the same county, in England, both citizens of Great Britain, have invented certain new and useful Improvements in Circuits for Telephonic Communication, (patented in Great Britain October 30, 1882, No. 5,166, and in France April 30, 1883, No. 155,180,) of which the following is a specification.

Our invention relates to the arrangement of circuits for telephonic communication where an induction-coil and induced currents are used, and it is designed to improve the clearness and loudness of articulated messages or other sounds. It is usual, where an induction-coil and an induced current are used, to place the telephone-receiver in the secondary or induced circuit forming part of the line-wire. We find that greatly-improved results in clearness and loudness can be obtained by placing the telephonic receiver in a local circuit and a suitable battery, and which forms the tertiary wire of an induction-coil. In this manner the secondary wire forms part of the line-wire without direct communication with either transmitter or telephone-receiver, and is put to earth at each end.

This arrangement is illustrated at Figure 1, and more clearly in Fig. 4, on the drawings appended hereto, where A and B are the two stations, connected by the line-wire C. Suitable continuations of this line-wire are wound as secondary wires upon the induction-coils D and D', and the extremities are put to earth at E and E', respectively. The receiver R, with a battery, F, at each station, is placed in a local circuit forming the tertiary wire of the induction-coils. The transmitter T in each case is in the primary circuit, which includes the battery F'. In the transmission, then, of words or sounds from one station, A, to the station B the current induced in the line-wire by the variations of the primary transmitting-current does not act directly on the receiver at the other station, B, but by induction produces the necessary variations in the constant local current passing through the receiver at the receiving-station B.

The term "circuit" used herein may be understood to mean a circuit metallically closed or an open circuit, so long as the approximations of the terminals or other conditions permit an electrical impulse to travel through or along the said circuit.

By special construction an instrument may, if desired, be used in conjunction with a battery in the local tertiary circuit, hereinbefore described, which shall act both as a transmitter and as a receiver.

Alternatively we may employ for the receiver an independent tertiary circuit wound round the induction-coil, so as to receive the necessary induced variations from the secondary line-wire. This circuit includes a suitable battery, where the receiver is not provided with a permanently-magnetized core, in which latter case the battery in the tertiary circuit may be dispensed with. These arrangements of tertiary circuits are shown at Figs. 1 and 2. In the former the receivers R are in independent circuits, each including a battery, F, at each station, the wire being wound as a tertiary layer on the induction-coils D D'. Suitable continuations of the line-wire form the secondary coil in both induction-coils, the extremities being put to earth at E and E'. The transmitter T is placed in a primary local circuit including a battery, F'. Fig. 2 shows a receiver, such as the "Dolbear" in the tertiary circuit, which, in such case, is in an open circuit, which may or may not include a battery.

A great advantage results from our arrangement of an independent tertiary circuit, where a current of high tension is required for the receiving-instrument—such, for instance, as the Dolbear. Any required tension of the current may be obtained in the small tertiary circuit without requiring the same in the line-wire, where there would be excessive leakage under high tensions. Similarly the current in the tertiary circuit may be a so-called "quantity" current of low tension to suit the receiver, which condition would not be feasible in a line-wire of considerable length, and consequently of high resistance.

Alternatively a condenser-transmitter, T, may be placed in the primary circuit, together with a battery, F', as in Fig. 3, the circuit in this case being an open one. Any convenient receiver, R, is placed in the tertiary circuit, as before, with a battery, F.

Our above-described improvements in circuit arrangements are, however, applicable to any suitable telephonic receiver, and all connections to earth may be read as connections by a return-wire.

Having now described and ascertained the nature of our invention and the manner of carrying the same into effect, be it known that what we consider novel, and desire to protect by Letters Patent, is—

In a system of telephonic circuits, the combination of an inductorium having primary, secondary, and tertiary coils, with a transmitting-instrument in circuit with the primary coil and a receiving-instrument in the tertiary coil of the inductorium, the secondary coil being in the main line.

Signed at 6 St. Dunstans Hill, London, in the county of Middlesex, in England, this 6th day of August, 1884.

HENRY ALABASTER.
TOM ERNEST GATEHOUSE.

Witnesses:
FRED CHEESWRIGHT,
SAM. P. WILDING.